Patented July 10, 1951

2,559,838

UNITED STATES PATENT OFFICE 2,559,838

THERMOSETTING POLYESTER COMPOSITIONS CONTAINING THIOPHENOLS

Thomas F. Anderson, Huntsville, Ala., assignor to Libbey-Owens-Ford Glass Company, Toledo, Ohio, a corporation of Ohio No Drawing. Application November 8, 1950, Serial No. 194,732

4 Claims. (Cl. 260—45.4)

The invention relates to stabilized thermosetting compositions, and more particularly to stabilized thermosetting compositions containing a polymerizable unsaturated polyester.

A polymerizable unsaturated polyester (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperatures is a great handicap in fabricating operations. By the time a urea-formaldehyde or phenol-formaldehyde composition has reached a fused state in a fabricating operation, its hardening already has begun, so that the hardening interferes with the shaping or molding of the composition.

A saturated heat-hardenable polyester, such as glycerol phthalate, is hardened by esterification with elimination of water. A polyester that is hardened by esterification cannot be employed to make a molded article or other solid body, because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without evolution of volatiles.

These important advantages have made polymerizable unsaturated polyesters of great commercial value; nevertheless the commercialization of such polyesters has been seriously impeded by the fact that such polyesters lack stability after the addition of the polymerization catalyst that is necessary to cause polymerization to take place. In the manufacture of commercial products from such polyesters, polymerization in the presence of a polymerization catalyst ordinarily is carried out at an elevated temperature in order to cause the polymerization to take place rapidly. After the addition of a polymerization catalyst to such a polyester, however, polymerization proceeds slowly at atmospheric temperatures. The rate of polymerization at atmospheric temperatures after the incorporation of a polymerization catalyst is rapid enough so that in a few days the polyester may become a substantially infusible, worthless mass that cannot be formed into any useful product.

The useful life of a polymerizable unsaturated polyester after incorporation of a polymerization catalyst is so short that it does not afford sufficient time for a manufacturer to ship the catalyst-containing polyester to a user. For that reason it was formerly the practice for the manufacturer of a polymerizable unsaturated polyester to ship the polyester without incorporating the polymerization catalyst, so that it was necessary for the user of the polyester to add the required proportion of the catalyst just before the polyester was used. The minute proportion of a polymerization catalyst required for a small batch of the material must be weighed out very accurately, then incorporated very uniformly throughout the batch. Uniform incorporation of a catalyst in a solid material such as molding composition is a particularly difficult operation and requires very expensive equipment.

Certain "inhibitors" for the polymerization of unsaturated polyesters are known. It has been found, however, that the addition of such an inhibitor to a mixture of a polymerizable unsaturated polyester and a polymerization catalyst has no better effect than the omission of part of the polymerization catalyst from the mixture. The addition of such an inhibitor not only retards the polymerization of the mixture at amospheric temperatures to the same extent as the polymerization would have been retarded by omission of a certain proportion of the polymerization catalyst from the mixture, but also interfers with the polymerization at molding temperatures, particularly after the material has been stored for a few days, so as to impair the quality of the molded product to the same extent as the quality would have been impaired if that same proportion of the polymerization catalyst had been omitted. These inhibitors are of no value for the purpose of stabilization, because it is useless to add an inhibitor when exactly the same effect can be obtained by omitting part of the polymerization catalyst. Certain substances are known which, in conjunction with oxygen, have the effect of greatly retarding the polymerization at atmospheric temperatures of a mixture of a polymerizable unsaturated polyester and a polymerization catalyst, without producing a corresponding impairment of the quality of the molded product.

(Such substances are referred to as "stabilizers" to distinguish them from ordinary inhibitors.) However, the stabilizing effect in that case is the combined effect of oxygen and the stabilizing substance. The stabilizing effect is not produced by such a substance alone, but requires the presence of oxygen. Therefore, in order to stabilize a mixture of a polymerizable unsaturated polyester and a polymerizable catalyst by means of such a substance, it has been necessary to prepare the composition, containing such a substance, in a physical form such that the composition is thoroughly permeated by air.

In many applications it is inconvenient or impractical to maintain a composition containing a polymerizable unsaturated polyester (which is ordinarily a liquid) and a polymerization catalyst in such physical form that it is thoroughly permeated by air, but no substances have been known to retard the polymerization of such a composition at atmospheric temperatures without producing a corresponding impairment of the quality of the molded product, except certain substances that produce such effect only so long as the composition is thoroughly permeated by air.

The principal object of the invention is the stabilization of a mixture of a polymerizable unsaturated polyester and a polymerization catalyst without the necessity of keeping the composition permeated by air. More specific objects and advantages are apparent from the following description, which illustrates and discloses but is not intended to limit the scope of the invention.

The present invention is based upon the discovery that a certain type of substance has the effect of greatly retarding the polymerization at atmospheric temperatures of a mixture of a polymerizable unsaturated polyester and a polymerization catalyst, even while air is excluded from the mixture, without producing a corresponding impairment of the quality of the molded product. The fact that the stabilizing effect obtained in the practice of the invention does not require the presence of oxygen has been demonstrated as follows:

One of the stabilizers heretofore used (0.4 gram of guaiacol) and a polymerization catalyst (3 0 grams of benzoyl peroxide) were mixed intimately with 100 grams of a polymerizable unsaturated polyester and 35 grams of diallyl phthalate (an unsaturated substance that is capable of copolymerizing with the unsaturated polyester), and the resulting viscous liquid was mixed with 180 grams of asbestos fiber in a Banbury mixer. The resulting mixture was removed from the Banbury mixer in the form of a solid lump about two inches in diameter. After standing for three weeks at 90 degrees F., the lump of material had polymerized to a worthless mass. Thus it was demonstrated that the stabilizing effect is not produced by this known stabilizer alone in the absence of oxygen.

The procedure described in the preceding paragraph was repeated, but in this case the guaiacol was replaced by an equal amount of thio-beta-naphthol (a stabilizer of the present invention). At the end of three weeks, the composition was still fusible and could be molded into useful articles under heat and pressure.

Since a stabilized thermosetting molding composition embodying the invention does not require the incorporation of a catalyst by the user, it can be used by small fabricators who have no equipment for incorporating a catalyst in a molding composition, and can be used more economically by large fabricators than a material requiring the addition of a catalyst by the user.

A composition embodying the invention comprises (1) a polymerizable unsaturated polyhydric alcohol-polycarboxylic acid polyester; (2) a catalyst of the class consisting of organic peroxides and organic ozonides; and (3) an agent for increasing the stability of the composition at atmospheric temperatures without proportionately decreasing the curability of the composition, a thiophenol in which any atoms other than carbon, hydrogen, sulfur and oxygen consist of halogen atoms having an atomic weight greater than 35.

Preferably the composition also contains a polymerizable unsaturated monomeric substance. The properties of finished articles produced by polymerization of a composition embodying the invention are better when the composition contains a polymerizable, unsaturated monomeric substance, so that such a substance is ordinarily used in the composition. It is believed that because of their large size the polyester molecules are not mechanically well adapted to polymerize with one another and that the better properties of finished articles produced from a composition containing a polymerizable unsaturated monomeric compound are due to the superior curability of such a composition. The monomeric compound is believed to impart better curability to the composition because of its ability to cross link the unsaturated polyester molecules by copolymerizing with such molecules.

STABILIZER

A stabilizer of the invention increases the stability at atmospheric temperatures of a composition comprising a polymerizable unsaturated polyester and a catalyst, without proportionately decreasing the curability of the composition. The stabilizer in a composition embodying the invention is a thiophenol in which any atoms other than carbon, hydrogen, sulfur and oxygen consist of halogen atoms having an atomic weight greater than 35.

The term "thiophenol" is used herein to mean a monohydroxy or polyhydroxy benzene or naphthalene in which an oxygen atom in at least one nuclear hydroxy group has been replaced with a sulfur atom. A thiophenol which is used as a stabilizer in the present method may be unsubstituted (e. g., it may be thiophenol or a thionaphthol such as thio-beta-naphthol) or it may be substituted in all possible positions on the thiophenol nuclei. Thus, if the thiophenol is a monocyclic thiophenol, there can be as many as five nuclear substituents, and if a thionaphthol, as many as seven nuclear substituents. The nuclear substituents may include not only hydroxy groups but also primary, secondary and tertiary alkyl radicals containing from 1 to 18 carbon atoms (e. g., methyl, ethyl, propyl, isopropyl, n-butyl, isobutyl, secondary butyl and tertiary butyl radicals, and any primary, secondary or tertiary alkyl radical having from 5 to 18 carbon atoms); alkenyl radicals containing from 2 to 8 carbon atoms (e. g., vinyl, propenyl, butenyl, pentenyl hexenyl, heptenyl and octenyl radicals); substituted alkyl and alkenyl radicals in which the substituents may include halogen atoms having an atomic weight greater than 35 (i. e., chlorine, bromine and iodine), and hydroxy groups; alkoxy groups such as methoxy, ethoxy, propoxy and butoxy; and halogen atoms having an atomic weight greater than 35.

The preferred stabilizer in the practice of the invention is a thiophenol whose molecule consists of carbon, hydrogen and sulfur atoms. It is preferred also that such a thiophenol have not more than ten carbon atoms in its molecule. Such thiophenols include: o-thiocresol

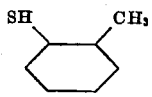

thiophenol

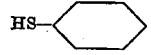

and thio-beta-naphthol

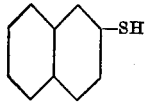

The most desirable stabilizer in the practice of the invention is thio-beta-naphthol, as hereinafter further discussed.

CATALYST

A stabilized thermosetting composition of the invention contains a catalyst of the class consisting of organic peroxides and organic ozonides, which is essential for rapid polymerization of the composition at molding temperatures. The term "organic peroxides" includes compounds having the general formula

wherein R is alkyl, aralkyl, acyl, or hydroxy-substituted or halo-substituted alkyl, aralkyl or acyl, and Y is hydrogen or is of the same class as R.

Acidic peroxides in which Y and R are acyl or hydroxy- or halo-substituted acyl, which may be used as catalysts in the practice of the invention include: bis(benzoyl) peroxide, bis(p-bromobenzoyl) peroxide, bis(phthalyl) peroxide, bis(p-chlorobenzoyl) peroxide, bis(dichlorobenzoyl) peroxide, bis(succinyl) peroxide, acetyl benzoyl peroxide, bis(acetyl) peroxide and bis(chloroacetyl) peroxide.

Peroxy acids in which R is acyl and Y is hydrogen, and peroxy acid esters in which R is acyl and Y is alkyl or aralkyl, which act as curing catalysts in the present invention, include peracetic acid, perbenzoic acid, t-butyl perbenzoate and benyl peracetate.

Hydrogen peroxides in which R is alkyl or aralkyl and Y is hydrogen, which act as curing catalysts in the present invention, include t-butyl hydroperoxide.

Organic ozonides which may be used as curing catalysts in the practice of the present invention include diisopropylene ozonide and diisobutylene ozonide.

Mixtures of organic peroxides and organic ozonides may also be used as the curing catalyst. Organic peroxides in which R is benzoyl or halo-substituted benzoyl such as benzoyl peroxide (i. e., bis(benzoyl) peroxide), bis(p-chlorobenzoyl) peroxide, bis(p-bromobenzoyl) peroxide, bis(dichlorobenzoyl) peroxide, and t-butyl perbenzoate, are very effective in the production of molded products having good cured quality.

FILLERS

A stabilized thermosetting composition of the invention may contain a filler. The filler may be an organic filler (i. e., a filler from a vegetable or animal source) or an inorganic or mineral filler. Organic fillers which may be used include alpha cellulose which is the purest and lightest-colored organic material ordinarily available and cotton linters. Inorganic or mineral fillers which may be used include fibrous fillers such as glass fibers or asbestos, and non-fibrous fillers such as ground glass, clay, mica, talc or calcium silicate.

POLYMERIZABLE UNSATURATED POLYESTER

Any unsaturated polyester that is polymerizable into an infusible resin at ordinary molding temperatures, or any mixture of such materials with one another or with one or more other materials which may or may not be polymerizable, may be used in the practice of the present invention. The polymerizable unsaturated polyester may be a limpid liquid of very low viscosity, or a tacky, viscous liquid, or may be of any consistency depending upon the materials used in its preparation and the degree to which they are reacted.

A polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). Ordinarily it is desirable that the unsaturated polyester be polymerizable into an infusible or high melting point resin, so that the proportion of unsaturated components should be such that the polyester contains an average of more than one double bond per molecule (for example, there may be an average of eleven or more double bonds in every ten molecules of the polyester) and for the purposes of the instant invention is to be understood that the term "unsaturated polyester" means a polyester that is polymerizable into an infusible or high melting point resin.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3 or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportion. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired properties. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired inhibitor such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

5.4 mols of maleic anhydride and 5.4 mols of diethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to .02 per cent of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the reacting ingredients and an amount of p-toluene sulfonic acid equal to 0.18 per cent of the reacting ingredients; and the reaction is carried out for four hours at 200° C. to produce a stiff liquid having an acid number of 10.6.

As a further alternative, the first procedure may be employed except that 6 instead of 5.4 mols of maleic anhydride are employed; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As a further variation the first procedure may be used except that the maleic anhydride is replaced by 1.5 mols of fumaric acid; 1.5 instead of 5.4 mols of diethylene glycol are employed; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; 3.0 instead of 1.5 mols of diethylene glycol are used; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200-210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the reacting ingredients is added at the start of the reaction; and reaction is carried out at 200° C. for 5 hours to produce a stiff liquid which has an acid number of 10.1.

MONOMERS

Although a polymerizable unsaturated polyester may be used alone as the polymerizable binder in the practice of the present invention, it is often desirable to incorporate a polymerizable unsaturated monomeric substance with the polymerizable unsaturated polyester. At molding temperatures the monomer aids in curing by cross linking straight chain polyester molecules. The combination of the polyester and the monomeric compound usually polymerizes more rapidly than either of such substances alone. When used in the proper proportions the monomer improves the water resistance and insolubility of the final product.

A polymerizable unsaturated monomeric substance used in the practice of the present invention may be any substance (or mixture of such substances) whose molecule contains at least one polymerizable ethylenic double bond that is capable of copolymerizing with a polymerizable unsaturated polyhydric alcohol-polycarboxylic acid polyester. The polymerizable ethylenic double bond or plurality of polymerizable ethylenic double bonds may be contained in radicals of unsaturated acids, such as maleic, fumaric, citraconic and mesaconic acids, or in other unsaturated radicals such as vinyl, allyl and crotyl radicals. These unsaturated radicals may be connected directly to carbon atoms in the molecule, or may be connected to the rest of the molecule by ester, ether or amide linkages.

A polymerizable unsaturated monomeric substance whose molecule contains only one polymerizable ethylenic double bond may be a vinyl compound such as styrene, or p-methyl styrene, 2,4-dimethyl styrene, 2,3-dimethyl styrene, 2,5-dimethyl styrene, isopropenyl toluene, vinyl naphthalene, vinyl benzoate, vinyl dibenzofuran or acrylonitrile; or an alkyl ester or the amide of a monobasic acid whose molecule contains one ethylenic double bond or the aldehyde corresponding to such an acid, such as methyl acrylate, methyl methacrylate, isobutyl methacrylate, methacrolein, acrolein, acrylamide, methacrylamide, crotonaldehyde, or cinnamaldehyde; or an ester of a monohydric alcohol whose molecule contains one ethylenic double bond with a saturated monobasic acid, e. g., allyl lactate or crotyl glycolate.

A polymerizable unsaturated monomeric substance whose molecule contains two or more polymerizable ethylenic double bonds may be an ester of a monohydric alcohol whose molecule contains one polymerizable ethylenic double bond with a monobasic acid whose molecule contains one polymerizable ethylenic double bond (e. g., allyl acrylate or allyl methacrylate); or an ester or mixed ester of a molecule of a saturated dihydric alcohol with two molecules of a monobasic acid whose molecule contains one polymerizable ethylenic double bond (e. g., ethylene dimethacrylate, triethylene dimethacrylate, propylene dimethacrylate, hexamethylene dimethacrylate); or an ester or mixed ester of two alcohol molecules, each consisting of a molecule of allyl, crotyl, alpha-methyl allyl, methallyl, beta-chloro allyl or beta-methyl crotyl alcohol, with a molecule of any of the dibasic acids listed in Table I below.

Table I

Maleic acid

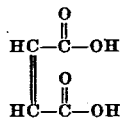

Chloromaleic acid

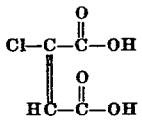

Bromomaleic acid

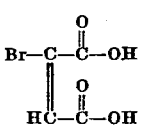

Fumaric acid

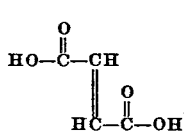

Chlorofumaric acid

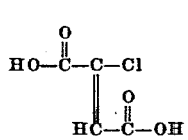

Bromofumaric acid

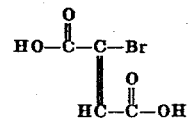

Mesaconic acid

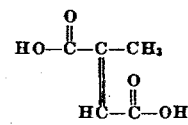

Citraconic acid

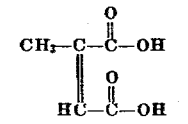

Itaconic acid

Carbonic acid

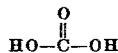

Oxalic acid

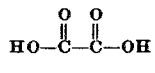

Malonic acid

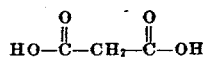

Succinic acid

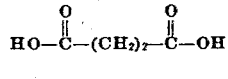

Glutaric acid

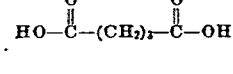

Adipic acid

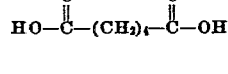

Pimelic acid

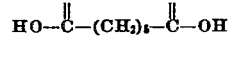

Suberic acid

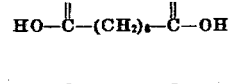

Azelaic acid

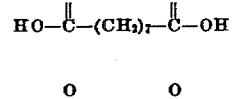

Sebacic acid

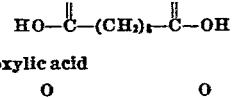

Benzene dicarboxylic acid

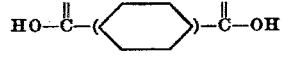

Biphenyldicarboxylic acid

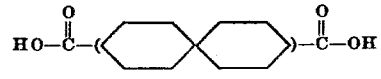

Naphthalene dicarboxylic acid

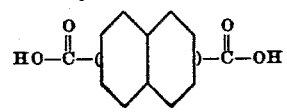

Cyclohexane dicarboxylic acid

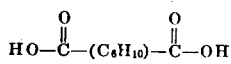

Pyrotartaric acid

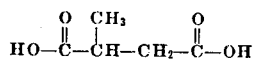

Phenyl phosphonic acid

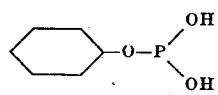

"Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acid, any of the various position isomers may be used either in cis or in trans relationship.

The polymerizable unsaturated monomeric substance may also be an ester of a molecule of one of the dibasic acids listed in Table I with one molecule of a saturated monohydric alcohol such as methyl, ethyl, n-propyl, isopropyl, n-butyl, isobutyl, secondary butyl or tertiary butyl alcohol or Cellosolve and one molecule of one of the unsaturated monohydric alcohols hereinbefore described.

The polymerizable monomeric compound may also be an ester or mixed ester of a molecule of a tribasic or other polybasic organic or inorganic acid with three or more monohydric alcohol molecules each having a polymerizable ethylenic double bond. Such monomeric compounds include triallyl tricarballylate, triallyl aconitate, triallyl citrate, triallyl phosphate, trimethallyl phosphate, triallyl cyanurate, and tetrallylsilicate.

The polymerizable monomeric compound may also consist of an ester of two substances that will be described, one of which has a carboxy group and the other of which has an alcoholic hydroxy group. The substance having a carboxy group may have the general formula F—OH, in which F is the acid radical of acrylic, methacrylic, or alpha-chloracrylic acid, or may have the general formula R—O—D—OH, in which R is methyl, ethyl, n-propyl, isopropyl, n-butyl, isobutyl, secondary butyl or tertiary butyl, and D is the divalent acid radical of any of the first nine dibasic acids listed in Table I. When R in the latter general formula is allyl, crotyl, alphamethyl allyl, methallyl, beta-chloro allyl or betamethyl crotyl, D may be the divalent acid radical of any of the dibasic acids listed in Table I.

The substance having an alcoholic hydroxy group may consist of a compound having the general formula $$R-O-\overset{O}{\overset{\|}{C}}-B-OH$$

in which R is the monovalent hydrocarbon radical or monovalent chlorinated hydrocarbon radical of any of the alcohols listed in Table II, below, and in which B is methylene, methyl methylene, or any phenylene radical. The substance having an alcoholic hydroxy group may also consist of a compound having the general formula R—O—D—O—E—OH in which D is the divalent acid radical of any of the dibasic acids listed in Table I, R has the same significance as in the preceding general formula and E is the divalent radical to which two hydroxy groups are attached in any of the dihydroxy compounds listed in Table III below.

Table II

Allyl alcohol $$CH_2=CH-CH_2-OH$$

Crotyl alcohol $$CH_3-CH=CH-CH_2-OH$$

Alpha-methyl allyl alcohol $$CH_2=CH-\underset{\underset{CH_3}{|}}{C}H-OH$$

Methallyl alcohol $$CH_2=\underset{\underset{CH_3}{|}}{C}-CH_2-OH$$

Beta-chloro allyl alcohol $$CH_2=\underset{\underset{Cl}{|}}{C}-CH_2-OH$$

Beta-methyl crotyl alcohol $$CH_3-CH=\underset{\underset{CH_3}{|}}{C}-CH_2-OH$$

Table III

Ethylene glycol $$HO-CH_2-CH_2-OH$$

Propylene glycol $$CH_3-\underset{\underset{OH}{|}}{C}H-CH_2-OH$$

1,2-butylene glycol $$HO-CH_2-\underset{\underset{OH}{|}}{C}H-CH_2-CH_3$$

2,3-butylene glycol $$CH_3-\underset{\underset{OH}{|}}{C}H-\underset{\underset{OH}{|}}{C}H-CH_3$$

Tri-methylene glycol $$HO-(CH_2)_3-OH$$

Tetra-methylene glycol $$HO-(CH_2)_4-OH$$

Penta-methylene glycol $$HO-(CH_2)_5-OH$$

Hexa-methylene glycol $$HO-(CH_2)_6-OH$$

Hepta-methylene glycol $$HO-(CH_2)_7-OH$$

Octa-methylene glycol $$HO-(CH_2)_8-OH$$

Diethylene glycol $$HO-CH_2-CH_2-O-CH_2-CH_2-OH$$

Triethylene glycol $$HO-(CH_2-CH_2-O)_2-CH_2-CH_2-OH$$

Tetraethylene glycol $$HO-(CH_2-CH_2-O)_3-CH_2-CH_2-OH$$

o-, m- or p-Dihydroxy benzene

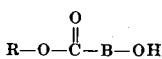

Such a polymerizable monomeric carbon compound thus has the general formula

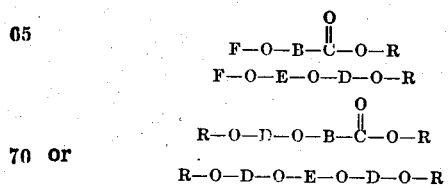

Polymerizable monomeric compounds having the general formula F—O—E—O—D—O—R may be prepared by first reacting one molecule of a dihydroxy compound listed in Table III with one molecule of the monochloride of a half ester of one of the dibasic acids listed in Table I with one of the alcohols listed in Table II, or in some cases of the half ester itself. (For example, a molecule of allyl chlorcarbonate, which has been prepared by reacting one molecule of allyl alcohol with a molecule of phosgene, may be reacted with a molecule of diethylene glycol.) One molecule of the resulting product may then be reacted with one molecule of the chloride of acrylic, methacrylic or alpha-chloracrylic acid or in some cases of the acid itself.

Polymerizable monomeric compounds having the general formula

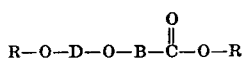

include the diallyl ester of lacto-carbonate and the diallyl ester of hydroxy-aceto-carbonate. Other compounds having this general formula, as well as polymerizable monomeric compounds having the general formula

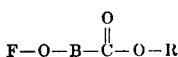

may be prepared by reacting one molecule of an ester of an alcohol listed in Table II with a monobasic hydroxy-substituted, chloro-substituted or bromo-substituted acid, such as glycolic acid, chloracetic acid, lactic acid, alpha-bromo propionic acid or hydroxy benzoic acid, (e. g., allyllactate or crotyl glycolate) with one molecule of a derivative of acrylic, methacrylic or alpha-chloracrylic acid or with one molecule of a derivative of a half ester of one of the dibasic acids listed in Table I with one of the alcohols listed in Table II. In the case of the first nine dibasic acids listed in Table I, the half ester may also be a half ester of methyl, ethyl, propyl, isopropyl, n-butyl, isobutyl, secondary butyl or tertiary butyl alcohol.

Polymerizable monomeric compounds having the general formula

R—O—D—O—E—O—D—O—R include: diallyl ethylene glycol dioxalate, diallyl ethylene glycol dicarbonate, diallyl diethylene glycol dicarbonate, diallyl trimethylene glycol dicarbonate, diallyl ethylene glycol disuccinate, diallyl ethylene glycol diadipate, diallyl diethylene glycol dimaleate, dimethallyl diethylene glycol dicarbonate, diallyl diethylene glycol dimalonate, 2-(oxycarballyloxy) ethyl ethyl fumarate and 2-(oxycarbomethallyloxy) ethyl methyl fumarate.

The polymerizable monomeric carbon compound may also consist of an ester of a molecule of any of the dibasic acids listed in Table I with two similar molecules (or a mixed ester of a molecule of such a dibasic acid with two dissimilar molecules) each of which is an ester of glycolic, lactic or o-, m- or p-hydroxy benzoic acid with any of the alcohols listed in Table II. Such a polymerizable monomeric carbon compound has the general formula

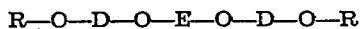

An amino acid such as glycine may be used in place of lactic, glycolic or o-, m- or p-hydroxy benzoic acid, so that the general formula is then

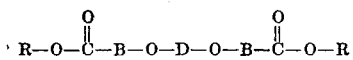

Such monomeric compounds include: carbonyl bis(methallyl lactate), carbonyl bis(crotonyl lactate), carbonyl (bis(allyl lactate), maleyl bis(allyl lactate, fumaryl bis(allyl lactate), succinyl bis(allyl lactate), adipyl bis(allyl lactate), sebacyl bis(allyl lactate), phthalyl bis(allyl lactate), fumaryl bis(allyl glycolate), carbonyl bis(allyl glycolate), carbonyl bis(allyl salicylate) and oxalyl bis(allyl glycinate).

The polymerizable monomeric carbon compound may also consist of an ether of two similar or dissimilar molecules each consisting of an ester of glycolic, lactic or o-, m- or p-hydroxy benzoic acid with any of the alcohols listed in Table II. Such a polymerizable monomeric carbon compound has the general formula

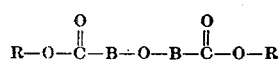

Monomeric compounds having this general formula include: the esters of alcohols listed in Table II with diglycolic acid, with diethyl ether alpha, alpha'-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxy-benzoic acid with chloracetic or alpha-chlorpropionic acid in accordance with the usual procedure for preparing ethers. The product may then be esterified with any of the alcohols listed in Table II. If it is desired to prepare a compound of this type whose molecule is an ester of two different alcohols, it may be more convenient to prepare an ester of one of the alcohols listed in Table II with glycolic, lactic or hydroxy-benzoic acid, and then to react the sodium derivative of such ester with the ester of a different alcohol listed in Table II and chloracetic or alpha-chloropropionic acid, to form the ether linkage.

The polymerizable monomeric carbon compound may also consist of an ether of a molecule of ethylene glycol, propylene glycol, 1,2-butylene glycol, 2,3-butylene glycol or o-, m- or p-dihydroxy benzene with two similar or dissimilar molecules each consisting of an ester of glycolic, lactic or o-, m- or p-hydroxy benzoic acid with any of the alcohols listed in Table II. Such a polymerizable monomeric carbon compound has the general formula

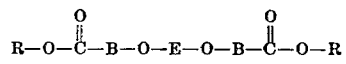

A compound having the general formula

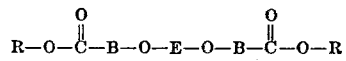

may be prepared by reacting one molecule of a sodium derivative of ethylene, propylene or a butylene glycol or of a hydroxy benzene with two molecules of an ester of chloracetic acid or alpha-chloropropionic acid with one of the alcohols listed in Table II, in accordance with the usual procedure for preparing ethers. If an unsymmetrical compound having this general formula is desired, one molecule of the ester of chloracetic or alpha-chloropropionic acid may be reacted with one molecule of the sodium derivative and the product may then be reacted with one molecule of a different ester of such an acid. As an alternative method, one molecule of the dichloro or dibromo compound corresponding to ethylene, propylene or a butylene glycol may be reacted with two molecules of the sodium derivative of the ester of glycolic, lactic or a hydroxy benzoic acid with one of the alcohols listed in Table II.

The polymerizable monomeric compound may also consist of an ester of a molecule of silicic acid with four molecules of an ester of glycolic or lactic acid with any of the alcohols listed in Table II. Such a polymerizable monomeric carbon compound has the general formula

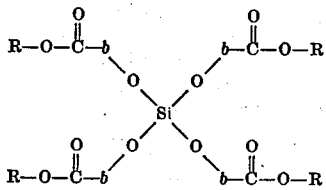

in which b is methylene or methyl methylene and R has the same significance as before. Such compounds include tetra(allyl glycolate) silicate and tetra(allyl lactate) silicate.

PREPARATION OF STABILIZED COMPOSITION

In a stabilized thermosetting composition of the present invention containing a filler, the proportion of filler to polymerizable binder (i. e., polymerizable unsaturated polyester or mixture thereof with a polymerizable unsaturated monomeric compound or with other substances which may or may not be polymerizable) varies with the specific characteristics of the binder and filler and with the desired physical form of the composition.

In general, the proportion of an organic filler may range from 0 to about 75 per cent of the thermosetting composition. (As used herein the terms "per cent" and "parts" mean per cent and parts by weight unless otherwise designated.) Usually, when an organic filler is used, it is preferable that the proportion be within a range of about 50 to 65 per cent of the composition, and it is most desirable that it be about 60 per cent of the composition. The proportion of an inorganic filler may range from 0 to about 85 per cent of the thermosetting composition, but when an inorganic filler is used, it is usually preferable that it be within a range of about 60 to 70 per cent of the composition. However, these ranges vary with the specific characteristics of the polymerizable binder in the composition.

The proportion of filler may be as large as it is possible to employ while still permitting the material to be held together by the binder in the form of a coherent finished article. The maximum proportion of filler that can be employed depends upon the absorbency of the filler, because an absorbent filler reduces the apparent proportion of binder by absorbing more of the binder.

As hereinbefore stated, from the standpoint of economy of time and money it is desirable that a thermosetting composition when received by the user contain a catalyst that promotes rapid polymerization of the composition at molding temperatures. However, a curing catalyst incorporated in a thermosetting composition in an amount sufficient to cause the composition to cure completely at molding temperatures so as to produce fully cured molded articles, in the absence of a stabilizer has the effect of promoting polymerization at atmospheric temperatures to such an extent that after storage for short periods the composition becomes a substantially infusible, worthless mass that cannot be formed into any useful product. Even during shipment such a thermosetting composition may become at least partially set up so that it is contaminated with hard spots of polymerized material. A few hard "stones" or precured granules may damage an expensive mold, and also may cause defective spots in pieces molded from such material which are readily apparent even to an inexperienced observer. Such spots make a molded piece unsatisfactory for commercial use.

The use of a smaller amount of curing catalyst than is normally required for complete cure at molding temperatures may be effective in preventing polymerization of the composition to an infusible worthless mass during storage or shipment. However, there is a proportionate loss in the water resistance, strength, electrical properties and general quality of articles molded from the composition. During storage some of the catalyst, which is in a reduced proportion to start with, appears to decompose so that the curability becomes progressively worse until the composition becomes a worthless unpolymerizable mass. The addition of an "inhibitor" in place of omission of part of the catalyst has the same undesirable effect—when an ordinary inhibitor is used in an amount sufficient to prevent polymerization of the composition at atmospheric temperatures to an infusible worthless mass, the inhibiting action remains in effect during fabrication of articles from the composition and interferes with polymerization during fabrication. During storage of the composition over a period of time the inhibitor in effect "uses up" the catalyst so that the composition eventually becomes a worthless unpolymerizable mass.

A thermosetting composition embodying the invention having incorporated therein a curing catalyst is "stable" at atmospheric temperatures because it contains a stabilizer (as hereinbefore defined). A thermosetting composition embodying the invention is "stable" during storage under ordinary conditions for a given period in that it meets both of the following conditions during that period: (1) the composition neither polymerizes to a hard unusable mass nor develops appreciable lumps or "hard centers" which will produce defective spots in pieces molded from such material and (2) the composition retains its plasticity and curability so that it can be molded into pieces having a cured quality that is unimpaired by such storage (i. e., the composition cures completely at molding temperatures in a very short time to hard pieces that are resistant to water and to deterioration and cracking from heat, etc.).

A composition embodying the invention is stable for over two months. This means that when the material has been stored at atmospheric temperatures for two months it is soft and free from "hard centers" or precured granules that damage the mold, and can be molded into pieces having a cured quality that is unimpaired by such storage. During storage after two months hard lumps of material may start to form and/or the curability of the material may start to decrease, but the material may still be quite satisfactory for commercial use for three months of storage. After three months of storage the material may not be stable, i. e., "hard centers" or precured granules may develop sufficiently to cause defective spots in a molded piece that make the piece unsatisfactory for commercial use, and/or the curability of the material may decrease to such an extent that the cured quality of the molded material is not good enough for it to be considered commercially useful.

A thermosetting composition embodying the invention rarely polymerizes during storage at atmospheric temperatures to a hard worthless mass. Instead it may become "unstable" because the curability of the material decreases. When the stability fails after a long period of storage by reason of loss of curability, such loss of curability may be due to the fact that the catalyst starts to decompose after such a period, so that the material does not cure properly because the proportion of curing catalyst is too low. A composition which does not contain a stabilizer and contains instead such a small amount of catalyst that polymerization does not occur at atmospheric temperatures would fail by reason of loss of curability after a shorter period, because the catalyst proportion is less to start with.

The proportion of curing catalyst used in the practice of the invention is simply the proportion that causes the composition to polymerize at the desired rate, and, as the term "catalyst" implies, such proportion is the usual catalytic amount, i. e., ranging from about 0.01 per cent to about 5 per cent of the polymerizable binder. It is ordinarily not desirable to use a concentration of catalyst larger than about 5 per cent of the polymerizable binder in an attempt to increase the curability at molding temperatures, because beyond a certain concentration, which varies for specific catalysts, the catalytic effect no longer increases and remains approximately constant. There is also a greater tendency for a composition containing an excess of curing catalyst to polymerize at atmospheric temperatures, so that unless the amount of stabilizer used in a thermosetting composition embodying the invention to prevent curing of the composition at atmospheric temperatures is also increased, the stability of the composition will be reduced. Furthermore, it is wasteful to use a large excess of curing catalyst because the rate of decomposition of the catalyst appears to increase with its concentration, so that the greater the amount of catalyst the more rapidly it appears to be lost during storage.

The preferred proportion of curing catalyst varies with different catalysts, and the amount of a specific curing catalyst required to produce a given rate of hardening may vary also with variations in the nature of the polymerizable composition. Benzoyl peroxide, which is preferred in the practice of the present invention, is desirably used in a concentration ranging from about 1 to about 3 per cent of the polymerizable binder.

The proportion of stabilizer in a thermosetting composition embodying the invention must be large enough to make the composition sufficiently stable at atmospheric temperatures to be commercially useful, but must not be so large that an inhibiting effect is produced at molding temperatures. That is, when too large an amount of stabilizer is present, polymerization of the composition is retarded at atmospheric temperatures, but there is a proportionate decrease in the curability at molding temperatures. When the material is heated during fabrication to the temperatures at which polymerization is usually carried out, e. g., 250 to 300 degrees F., the effect of the stabilizer is overcome provided there is not too much stabilizer present. Apparently at room temperature the stabilizer either prevents the formation of free radicals which might initiate polymerization, or prevents free radicals from activating the unsaturated compounds. At high temperatures the stabilizer is not effective against the free radicals, so that while a thermosetting composition may be stable at atmospheric temperatures, it suffers no loss of curability at molding temperatures. However, when too much stabilizer is present it may be sufficiently active at molding temperatures to destroy too many free radicals, so that the curability is reduced.

The proportion of stabilizer in a thermosetting composition embodying the invention may vary in accordance with the stability required of the composition. Ordinarily the proportion of stabilizer is such as to permit the composition to remain "stable" (as hereinbefore defined) at atmospheric temperatures for approximately two months or more. Thermosetting compositions which are stable for periods shorter than two months are not considered to be commercially useful. Thus, the maximum proportion of stabilizer in a thermosetting composition is that which is so large as to affect seriously the cured quality of the composition after two months' storage at atmospheric temperatures, so that the composition is not "stable" (as hereinbefore defined) after two months. The minimum proportion of stabilizer is that which is so small as to be ineffective in retarding the polymerization of the composition after two months' storage at atmospheric temperatures without a proportionate decrease in curability, so that the composition is not "stable" after two months. In general, the proportion of stabilizer in a composition embodying the invention may be as large as .4 per cent of the polymerizable binder or as small as .08 per cent of the polymerizable binder, but the proportion of stabilizer that may be used in the practice of the present invention differs with specific stabilizers as well as with the properties of the polymerizable binder and with the proportion and efficiency of the catalyst. For example, the proportion of o-thiocresol used in the practice of the present invention is not less than approximately .08 per cent of the polymerizable binder, and preferably is not less than about .16 per cent of the polymerizable binder. The proportion of this stabilizer used is not more than approximately .3 per cent of the polymerizable binder and preferably is not more than about .24 per cent of the polymerizable binder. When thiophenol is used as the stabilizer, it may be used in proportions ranging from a minimum of .08 to a maximum of .25 per cent of the polymerizable binder, but preferably is within the range .16 to .20 per cent of the polymerizable binder. When thio-beta-naphthal is used as the stabilizer, it may be used in proportions ranging from a minimum of .15 to a maximum of .4 per cent of the polymerizable binder, but preferably is within the range .2 to .3 per cent of the polymerizable binder. However, these ranges only indicate the practical proportions of such stabilizers that may be used to prepare a stabilized thermosetting composition embodying the invention containing the amount of curing catalyst ordinarily used and containing a polyester having ordinary properties. For example, although use of a stabilizer in the minimum amount indicated ordinarily gives a composition having a stability of at least two months, with a large amount of catalyst the stabilizer might have to be used in a larger proportion to produce the same stability; on the other hand, when the polymerizable binder has relatively less tendency to polymerize at atmospheric temperatures, the same proportion of the stabilizer might produce a stability of longer than two months.

The stabilizing effect produced by a specific stabilizer differs with various polymerizable unsaturated monomeric substances, as hereinbefore described, that may be present in the polymerizable binder. At molding temperatures such as monomeric substance often seems to aid in overcoming the stability toward polymerization produced by the stabilizer at atmospheric temperatures. The stabilizer neutralizes or immobilizes free radicals at atmospheric temperatures but is ineffective against the free radicals at molding temperatures, so that it does not decrease the curability of the composition at molding temperatures. The monomeric substance copolymerizes with the unsaturated polyester through ethylenic double bonds by means of chain reactions initiated by the free radicals so that at molding temperatures the monomeric substance aids in curing the composition.

The proportion of monomeric substance in the polymerizable binder that may be used in a thermosetting composition of the invention varies in accordance with the physical form of the composition as well as with the proportion and effectiveness of the stabilizer employed. In general, when less than 2 per cent of the polymerizable binder consists of a polymerizable monomeric substance, the monomer may be ineffective in helping to cross-link the straight chain polyester molecules at molding temperatures. Thus, it is desirable that the monomer comprise at least 2 per cent of the polymerizable binder, and the proportion of monomer may be as high as 98 per cent of the polymerizable binder. It is usually preferable that at least 20 to 40 per cent of the binder consist of a polymerizable unsaturated monomeric substance. A granular thermosetting composition which contains a polymerizable binder that consists of approximately 10 to 30 per cent of a polymerizable monomeric compound and about 70 to 90 per cent of a polymerizable polyester produces a final polymerized product that has excellent water resistance and insolubility.

In order to compare the effectiveness of various stabilizers which may be used in the preparation of a stabilized thermosetting composition embodying the invention, three simultaneous tests are conducted. In each test, several solid lumps, about two inches in diameter, of a putty-like material containing one of the stabilizers described hereinbefore are prepared and tested for stability as follows: (The stabilizer employed in each material so prepared is listed in the first column of Table IV, and the second column of Table IV indicates the amount used, which is approximately the optimum proportion for such a composition.)

A polymerizable binder, consisting of 23.6 parts of a polymerizable unsaturated polyester (prepared by esterifying 1.0 mol of ethylene glycol with 0.2 mol of phthalic anhydride and 0.6 mol of maleic anhydride by the procedure hereinbefore described to an acid number of 35) and 9.2 parts of a polymerizable unsaturated liquid monomer (diallyl phthalate), is mixed in a Banbury mixer with 1.3 parts of "Luperco ATC" catalyst (a paste consisting of 50 per cent benzoyl peroxide and 50 per cent tricresyl phosphate), 2 parts of a lubricant (zinc stearate), a filler consisting of 48 parts of clay and 20 parts of asbestos, and a stabilizer. The mixing is continued until a soft, homogeneous dough is obtained. The material is then removed from the mixer and formed into solid lumps about two inches in diameter. The lumps are cooled, and are then stored in closed containers at a temperature of 90 degrees F. and at 30 to 50 per cent relative humidity to determine the length of time for which the material may be stored before it can no longer be considered stable (i. e., to determine the moldable life of the material).

At intervals during storage, one lump of each putty-like material is cut through the center and examined for the presence of "stones" or hard centers (hardening ordinarily occurs first in the center). After examination of the centers, each lump so examined is extruded into a rod or ribbon about one-quarter inch thick, and the extruded material is tested for cured quality by molding it in a small tumbler mold at ordinary pressures (e. g., 1000–2000 pounds per square inch of projected area). The small tumbler so molded weighs about 13 grams and is 1½ inches high, having a top diameter of 1¾ inches and a bottom diameter of 1 1/16 inches.

The results of the tests are shown in the third column of Table IV. The figures represent the number of days for which the material containing a stabilizer indicated in the first column in an amount indicated in the second column is "stable," as hereinbefore defined.

For the sake of comparison, lumps of a material that is the same except that it contains no stabilizer are simultaneously prepared and tested by the procedure described hereinbefore. This material is the control indicated in Table IV. From the results shown in Table IV it is readily apparent that thermosetting compositions embodying the invention are stable for much longer periods at 90 degrees F. and at 30 to 50 per cent relative humidity than are compositions which are the same except that they do not contain one of the stabilizers used in the practice of the present invention. (Such conditions are more extreme than the conditions to which the material ordinarily would be subjected. At room temperature the stability is, of course, much better. For example, the stability at room temperature of the composition described as a control in Table IV below is approximately one month, in contrast to seven to eleven days at 90 degrees F.)

Table IV

| Stabilizer | Amount | Days Stable |
|---|---|---|
| | Parts | |
| o-thiocresol | .098 | 21 |
| thiophenol | .065 | 20 |
| thio-beta-naphthol | .098 | 36 |
| Control | | Less than 11 |

Thio-beta-naphthol is most outstanding in its effectiveness as a stabilizer in the present invention. Furthermore, it does not have the unpleasant odor which many thiophenols possess. Not only does thio-beta-naphthol impart greater stability to compositions of the invention than other thiophenols which may be employed in the present compositions, but it is also a much more effective stabilizer than its oxygen analogue, beta-naphthol. For example, when the thio-beta-naphthol in the putty-like composition prepared as hereinbefore described is replaced with .0098 part of beta-naphthol (approximately the optimum proportion), the stability of the lump of putty-like material is less than 17 days at 90 degrees F., in contrast to the stability of 36 days that is obtained with thio-beta-naphthol. Actually, this difference in stability is very conservative in comparison with the difference that is obtained when these materials are incorporated into a thermosetting composition which is in contact with air. For example, the lumps of the putty-like material containing either thio-beta-naphthol or beta-naphthol may be passed through warm rubber rolls to form sheets of a thickness of approximately 1/8 inch which are cooled and then stored in closed containers at 90 degrees F. and 30 to 50 per cent relative humidity. (The stability of the sheets containing thio-beta-naphthol is 150 days in contrast to only 50 days for the sheets in which the thio-beta-naphthol is replaced by beta-naphthol. The stability of the sheets under these conditions is 30 days if the thio-beta-naphthol is simply omitted.) Furthermore, this difference in the action of these two substances becomes even more marked as the amount of air in contact with the thermosetting composition increases. Thus, a molding composition in granular form which contains thio-beta-naphthol as a stabilizer shows a still greater improvement in stability over a similar granular molding composition which contains beta-naphthol.

In the preparation of a thermosetting composition embodying the invention the polymerizable binder, catalyst and stabilizer may be mixed with a filler in the proper proportions to obtain a homogeneous composition having the desired consistency, i. e., a soft dough, or a material having a leathery texture, etc. Mixing of a filler with the other ingredients may be carried out in any suitable mixing or kneading apparatus, e. g., by using any commercial mixer or by milling the filler into the material on a rubber mill. Mixing may be carried out at room temperature if the binder is not too viscous. If the viscosity of the binder is too great it may be necessary to warm the binder to reduce its viscosity when it is mixed with the filler. In any case, it is desirable to mix the binder in a liquid state with the filler so that the filler becomes thoroughly mixed with the binder.

If the binder in a composition embodying the invention comprises a viscous polymerizable substance and a less viscous polymerizable substance, the polymerization catalyst may be dissolved in the less viscous polymerizable substance before the two substances are mixed. Also, the polymerization catalyst may be dispersed in a filler, as by grinding with the filler in a ball-mill, before the filler is mixed with the binder. A fibrous filler may be impregnated with a solution of the polymerization catalyst in a volatile solvent and dried before the filler is mixed with the binder.

The stabilizer ordinarily may be added to the polymerizable binder after the addition of the catalyst. If there is a tendency for the material to polymerize at mixing temperatures when the catalyst is added the stabilizer may be added before the catalyst or with the catalyst. For example, when a binder containing a hard polyester is used it must be warmed in order to reduce its viscosity when it is mixed with a filler. Ordinarily during heating the composition containing a polymerization catalyst might polymerize. However, in the practice of the present invention the stabilizer that is added (before adding the catalyst or with the catalyst) functions to prevent polymerization during mixing, as well as during storage at atmospheric temperatures, of a thermosetting composition containing a polymerization catalyst.

USE AS A LAMINATING COMPOSITION

Although the foreging discussion of the stability of compositions embodying the invention has referred primarily to stabilized compositions embodying the invention which contain a filler and which may be used as molding compositions, a stabilizer used in the practice of the invention has been found to be extremely effective in extending the liquid life of thermosetting compositions embodying the invention which are used as laminating resins. For example, a stabilizer used in the practice of the invention in the amounts hereinbefore described is effective in preventing gelling of a laminating resin comprising a polymerizable binder and a catalyst, as hereinbefore described, for at least one month. A laminating resin which has a liquid life of one month, i. e., a resin which does not gel upon storage at atmospheric temperatures for one month, is advantageous for commercial use.

A laminating composition of the invention containing catalyst and stabilizer may be brushed or sprayed onto the material to be laminated (or the material may be dipped into a solution (e. g., a 50 per cent acetone solution) of the laminating resin), and the sheets of the material may be air-dried before assembling and curing under pressure by any of the procedures ordinarily employed in the production of laminates.

USE AS A MOLDING COMPOSITION

A composition comprising a polymerizable polyester is highly advantageous for the molding of articles under pressure. Since a polymerizable polyester is fusible and plastic at a relatively low temperature, it is possible to adjust the amounts of catalyst and stabilizer so that hardening at such a temperature takes place at a reasonable rate to allow ample opportunity for shaping and molding of the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde resins, which are plastic only at elevated temperatures at which they harden so rapidly that hardening interferes with shaping.

Hardening of a polymerizable polyester can be carried out at a temperature that is far below the decomposition temperature of the polyester and thus at a temperature at which discoloration does not take place. Other heat hardenable products, such as urea-, melamine- or phenol-formaldehyde products, must be heated much closer to their decomposition temperatures in order to cause hardening to take place even at moderate speed. When an attempt is made to harden such other products rapidly by raising the hardening temperature, discoloration or "burning" is likely to result.

A polymerizable polyester may be fabricated in an injection molding machine. A supply of the polyester containing the curing catalyst may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The main difference between such an operation and the ordinary operation of injection molding a thermoplastic material is that in the injection molding of the polymerizable polyester the mold is at a higher temperature than the supply cylinder, whereas in injection molding of a thermoplastic material the mold is at a lower temperature than the supply cylinder.

Thus a polymerizable polyester can be molded as economically as a thermoplastic material. The molding of other heat hardenable products is a much slower and more expensive operation than the molding of a thermoplastic material.

Care should be taken that any material incorporated in a composition embodying the invention does not tend to cause the composition to set up during its preparation or during storage (e. g., carbon black is undesirable for this reason). In the preparation of a molding composition, plasticizers, lubricants, fillers, pigments and other coloring matter may be incorporated if desired.

The following examples illustrate the preparation of a stabilized thermosetting composition.

*Example 1*

A polymerizable binder, consisting of 21.3 parts of a polymerizable unsaturated polyester (prepared by esterifying 20 mol per cent of propylene glycol and 80 mol per cent of ethylene glycol with 12.5 mol per cent of phthalic anhydride and 87.5 mol per cent of maleic anhydride by the procedure hereinbefore described to an acid number of 35) and 11.5 parts of a polymerizable unsaturated liquid monomer (diallyl phthalate), is mixed in a Banbury mixer with 1.3 parts of "Luperco ATC" catalyst, 2 parts of a lubricant (zinc stearate), a filler consisting of 48 parts of clay and 20 parts of asbestos, and a stabilizer (.098 part of thio-beta-naphthol). The mixing is continued until a soft, homogeneous putty is obtained. Lumps (approximately two inches in diameter) of the material so prepared remain stable at 90 degrees F. and at 30 to 50 per cent relative humidity for approximately 36 days. Lumps of a putty-like material prepared by a procedure that is the same except that no stabilizer is added are stable under the same conditions for less than 11 days.

*Example 2*

A stabilized composition of the invention is prepared by the procedure described in the preceding example except that the stabilizer used consists of .098 part of o-thiocresol. Lumps of the resulting composition at 90 degrees F. are stable for 21 days. Similar results are obtained when an equivalent proportion of diethylene glycol is used in place of the monoethylene glycol in the preparation of the polymerizable unsaturated polyester.

Having described the invention, I claim:

1. A stabilized thermosetting composition, comprising (1) a polymerizable unsaturated polyhydric alcohol-polycarboxylic acid polyester; (2) a catalyst of the class consisting of organic peroxides and organic ozonides; and (3) as an agent for increasing the stability of the composition at atmospheric temperatures without proportionately decreasing the curability of the composition, a thiophenol in which any atoms other than carbon, hydrogen, sulfur and oxygen consist of halogen atoms having an atomic weight greater than 35.

2. A stabilized thermosetting composition, comprising (1) a polymerizable unsaturated polyhydric alcohol-polycarboxylic acid polyester; (2) a catalyst of the class consisting of organic peroxides and organic ozonides; and (3) as an agent for increasing the stability of the composition at atmospheric temperatures without proportionately decreasing the curability of the composition, a thiophenol whose molecule consists of carbon, hydrogen and sulfur atoms.

3. A stabilized thermosetting composition as claimed in claim 2 wherein the thiophenol has not more than ten carbon atoms in its molecule.

4. A stabilized thermosetting composition as claimed in claim 1 wherein the thiophenol is thio-beta-naphthol.

THOMAS F. ANDERSON.

No references cited.